United States Patent [19]

Diepers et al.

[11] Patent Number: 4,574,438

[45] Date of Patent: Mar. 11, 1986

[54] METHOD OF MAKING PRESSURE-SENSITIVE TRANSDUCER

[75] Inventors: Heinrich Diepers, Hoechstadt; Herbert Schewe, Herzogenaurach, both of Fed. Rep. of Germany

[73] Assignee: Siemens Aktiengesellschaft, Berlin and Munich, Fed. Rep. of Germany

[21] Appl. No.: 680,420

[22] Filed: Dec. 11, 1984

Related U.S. Application Data

[62] Division of Ser. No. 536,408, Sep. 27, 1983, Pat. No. 4,495,434.

[30] Foreign Application Priority Data

Sep. 29, 1982 [DE] Fed. Rep. of Germany ....... 3236098

[51] Int. Cl.$^4$ .......................................... H04R 17/00
[52] U.S. Cl. .................. 29/25.35; 29/25.41; 29/25.42; 361/313; 156/268
[58] Field of Search ................. 29/25.35, 25.41, 25.42; 361/312, 313, 280, 283; 310/334; 156/89, 268

[56] References Cited

U.S. PATENT DOCUMENTS

| | | | |
|---|---|---|---|
| 3,118,133 | 1/1964 | Meeker et al. | 361/283 |
| 3,308,253 | 3/1967 | Krakinowski | 340/365 A |
| 3,940,637 | 2/1976 | Ohigashi et al. | 310/339 |
| 3,951,250 | 4/1976 | Pointon et al. | 340/365 C |
| 4,234,813 | 11/1980 | Iguchi et al. | 310/339 |
| 4,328,441 | 5/1982 | Kroeger, Jr. et al. | 310/339 |
| 4,412,209 | 10/1983 | Frame et al. | 340/365 C |

Primary Examiner—Howard N. Goldberg
Assistant Examiner—P. W. Echols
Attorney, Agent, or Firm—Mark H. Jay

[57] ABSTRACT

A pressure-sensitive transducer arrangement comprises a matrix of transducer elements which are formed at the points of intersection of row conductors (35, 36) and column conductors (5 to 7). A flat substrate (2) is provided with column conductors (5 to 7), each of which is covered with a similarly-structured piezoceramic material as a dielectric medium (15 to 17). This piezoceramic material is separated from the row electrodes (35, 36) by empty spaces (24 to 26). Due to bilateral spacing of less than 100 micrometers for the row conductors and column conductors, a sensor matrix is produced with a dense packing of pressure-sensors functioning as capacitors which are formed at the cross-points of the row and column conductors. These sensors are particularly adapted for use in the gripping device of an industrial robot and make it possible to detect and determine the position of robot workpieces.

2 Claims, 4 Drawing Figures

METHOD OF MAKING PRESSURE-SENSITIVE TRANSDUCER

This application is a divisional of application Ser. No. 536,408, filed Sept. 27, 1983, now U.S. Pat. No. 4,495,434.

BACKGROUND OF THE INVENTION

The present invention concerns a pressure-sensitive transducer arrangement having a matrix of transducer elements formed at the points of intersection of rows and columns of conductors. This transducer arrangement is intended particularly for use with industrial robots.

The PCT International Patent Publication No. WO 81/02223 discloses a pressure-sensitive transducer which has a matrix of transducer elements formed at the crosspoints of rows and columns of conductors (electrodes). This transducer arrangement comprises two piezoelectric polymer film layers made of polyvinylidene fluoride (PVDF), one provided with rows of conductors and the other with columns of conductors, and an electrically insulated intermediate layer sandwiched between them. This sandwich configuration is covered on each of the two flat, outer sides by an electrically conductive layer. In addition, perforated sheets may be placed over the two outer sides. The signal is generated by piezoelectric effect as a result of strain due to pressure on and bending of the piezoelectric layers.

In addition, capacitance-based pushbuttons (key) switches are known in which the compression of a dielectric medium causes a sudden change in capacitance. See, e.g., *Elektronikschau,* Vol. 9 (1980), p. 27. This change in capacitance is converted into pulses by means of appropriate circuitry. Since such keys have no mechanical contacts, they have a long useful life.

Finally, tactile sensors are known that contain conductive elastomers, conductive synthetic (plastic) materials, pressure-sensitive switching diodes, or piezo-resistive elements, as well as pneumatic switches. Such sensors, which have applications in industrial robots, are disclosed in the article "Sensors For Computer Controlled Mechanical Assembly" by S. Wang et al., *The Industrial Robot* (March, 1978), pp. 9–18. In the case of these sensors, however, it is difficult to reduce the individual sensor elements to the required dimensions in a cost-effective manner in order to realize a matrix with a smaller grid line spacing and, thus, a higher resolution as to location.

SUMMARY OF THE INVENTION

An object of the present invention is to provide a tactile surface-sensor matrix which is useful, particularly, for industrial robots. Such a surface sensor can be inserted in the gripping device of a robot making it possible to detect and determine the position of the robot's workpieces.

A further object of the invention is to provide a tactile sensor—that is, a pressure-sensitive transducer—having a sensor grid or matrix that may be manufactured with an extremely small grid line spacing.

The invention is based on the knowledge that the high dielectric constant of certain piezoceramics—and in particular, of lead-zirconate-titanate (PZT)—makes it possible to produce a capacitive sensor matrix with very small grid line spacing.

According to the invention, a pressure-sensitive transducer is formed by providing a substrate; a set of strip-shaped column conductors disposed on the substrate surface and electrically insulated from each other; a set of strip-shaped dielectric elements formed of a piezoceramic material, with each dielectric element located over a corresponding one of the column conductors; and a set of strip-shaped row conductors located above the dielectric elements and separated from these dielectric elements by small empty spaces.

With a grid size formed by row and column conductors of a few hundred micrometers and the air space above the dielectric medium, a sensitive surface sensor is attained which can be manufactured in a simple manner.

In a special design of the pressure-sensitive transducer according to the invention, the row or column conductor not covered by the dielectric medium can can be embedded in a so-called "interconnector".

To produce the pressure-sensitive transducer just described, a thin base plate (substrate) is metallized and covered with the dielectric medium. Either the row or column conductors are produced from this double layer by etching parallel grooves in the metal and dielectric layers down to the base plate. Next, these grooves are filled with electrically insulating material such as a self-hardening plastic. The exposed surface is then smoothed—by grinding it down, for example—and provided with clearance spacers. Preferably, these clearance spacers are produced photolithographically from a photo-sensitive layer. The row or column conductors are then arranged on these clearance spacers and can be attached, for example, to a plastic layer serving as a cover.

The foregoing and other objects, features and advantages of the invention will be apparent from the following more particular description of the preferred embodiments of the invention, as illustrated in the accompanying drawing.

DESCRIPTION OF THE PREFERRED EMBODIMENTS

Figure 1:
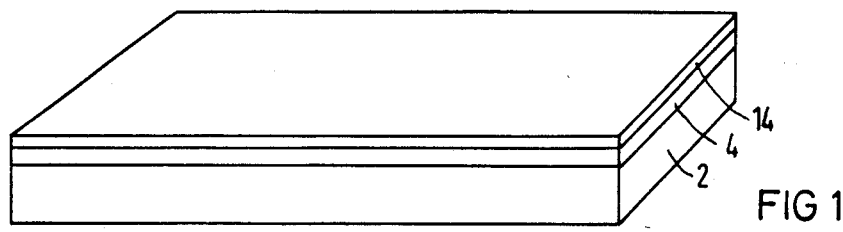
FIGS. 1 and 2 are perspective views illustrating successive steps for manufacturing a pressure-sensitive transducer according to the invention.

The preferred embodiments of the present invention will now be described with reference to FIGS. 1–4 of the drawings. Identical elements in the various figures are designated with the same reference numerals.

FIG. 1 shows a base plate or substrate 2. The thickness of this substrate will not substantially exceed 1000 micrometers and typically can be about 300 micrometers. The substrate can be formed of ceramic, aluminum oxide, lead-zirconate-titanate, a synthetic (plastic) material, or some other appropriate, non-conductive, support material. The substrate is provided with a metallization 4 suitable as an electrode. The metallization can consist of indium-tin (InSn), gold, or copper, for example, with a thickness not substantially exceeding 100 micrometers. Typically, the thickness is at most 10 micrometers. This metallization 4 is, in turn, provided with a coating layer 14 of a material having a high dielectric constant which is used as a dielectric medium.

In particular, the layer 14 may consist of piezoceramic material or synthetic (plastic) material with embedded ceramic particles, preferably of lead-zirconate-titanate (PZT), with a relative dielectric constant of approximately 4000. Generally, the thickness of this layer does not much exceed 100 micrometers and is preferably between approximately 10 to 100 micrometers. In the case of a synthetic (plastic) layer, a thickness of between approximately 5 to 100 micrometers is preferred.

Figure 2:
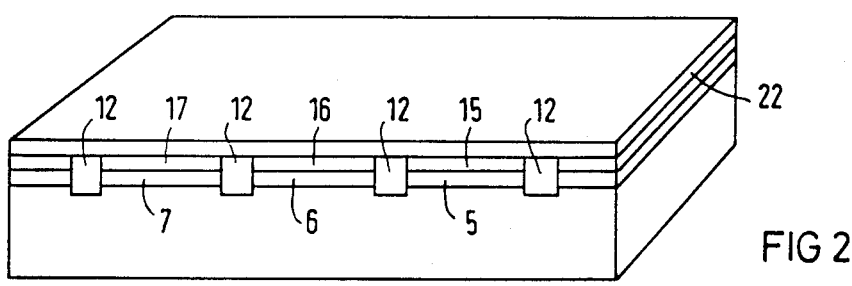

As shown in FIG. 2, this double layer consisting of the metallization 4 and the dielectric medium 14 is divided into strip-shaped regions by cutting parallel grooves extending down to the substrate 2. The metallic portions of these regions each form a column conductor or electrode, identified in FIG. 2 by numbers 5 to 7, and are each covered by a similarly-structured dielectric layer 15 to 17. The grooves 12 are then filled with an electrically insulating material, preferably a self-hardening synthetic (plastic) material (e.g., Araldite), and the exposed surface is smoothed (e.g., ground down).

Finally, the exposed surface is provided with a photosensitive layer 22, the thickness of which is at least 10 micrometers but which generally does not substantially exceed 100 micrometers.

Figure 3:
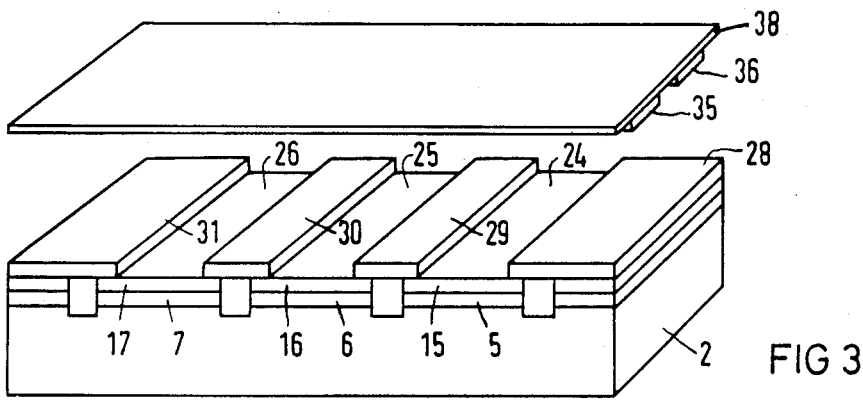
FIG. 3 is a perspective view of one preferred embodiment of a pressure-sensitive transducer according to the invention.

As shown in FIG. 3, empty spaces 24, 25 and 26 are produced in this photo-sensitive layer 22 by photolithography in the customary manner. The remaining bar-shaped portions of the layer 22 form clearance spacers 28, 29, 30 and 31 for row conductors (electrodes) 35 and 36. These row conductors are preferably arranged at right angles to the column conductors 5, 6 and 7 above the clearance spacers 28–31 and can be attached to a cover 38, for example. The row conductors 35 and 36 consist generally of metal—gold or copper, for example—and can be appropriately applies by vapor deposition or sputtering to the flat underside of the cover 38, which can consist of a synthetic (plastic) layer (e.g., Kapton).

The application of pressure on the cover 38 reduces the spacing at the crosspoint between the respective row conductor 35 or 36 and one of the column conductors 5–7 until contact is made with the associated dielectric layer strip 15–17 by the row conductor 35 or 36. This change in spacing and making contact effects a corresponding increase in the capacitance which, for example if lead-zirconate-titanate (PZT) with a relative dielectric constant of approximately 4000 is used as the dielectric medium, is at least one order of magnitude greater than the series capacitance formed by the air space and the dielectric layer when the device is in its quiescent state without the application of pressure. This change in capacitance is converted into a location-dependent electric signal by selecting the column and row electrodes.

Figure 4:
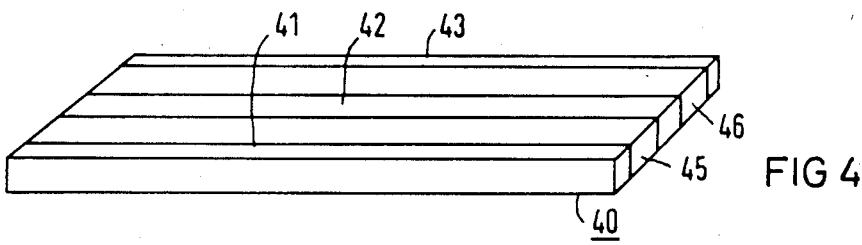
FIG. 4 is a perspective view of a special, alternative design of the row or column conductors in the pressure-sensitive transducer according to the invention.

According to the design shown in FIG. 4, the row or column electrodes 35 and 36 can also consist of a so-called "interconnector" 40 which incorporates electrically insulating regions 41, 42 and 43, arranged parallel to each other in an elastomer. Each two adjacent ones of these regions confine between them a strip-shaped, electrically conductive region thus forming row electrodes 45 and 46. This interconnector is then applied to the clearance spacers 28–31 and can also be appropriately equipped with a cover.

There has thus been shown and described a novel pressure-sensitive transducer which fulfills all the objects and advantages sought therefor. Many changes, modifications, variations and other uses and applications of the subject invention will, however, become apparent to those skilled in the art after considering this specification and the accompanying drawing which discloses preferred embodiments thereof. All such changes, modifications, variations and other uses and applications which do not depart from the spirit and scope of the invention are deemed to be covered by the invention which is limited only by the claims which follow.

What is claimed is:

1. Process for making a pressure-sensitive transducer arrangement comprising the steps of:
    (a) covering the surface of a substrate with a metal layer;
    (b) covering said metal layer with a dielectric layer formed of a piezoelectric material;
    (c) cutting grooves in said metal and dielectric layers cown to the substrate to create separate strip-shaped regions, the metal strips of which form column conductors;
    (d) filling said grooves with an electrically insulating material;
    (e) providing clearance spacers on the free surface of the strip-shaped regions; and
    (f) superimposing row electrodes over the clearance spacers thereby forming empty spaces at the crosspoints of the column and row electrodes, respectively.

2. The method defined in claim 1, wherein said clearance spacers are provided by the steps of:
    (1) forming a photo-sensitive layer over said dielectric layer; and
    (2) selectively removing portions of said photo-sensitive layer by photolithography.

* * * * *